Dec. 26, 1967  D. E. GUSTAFSON  3,360,325
ZOOM LENS SYSTEM FOR MICROFILM PROJECTORS
Filed May 27, 1964
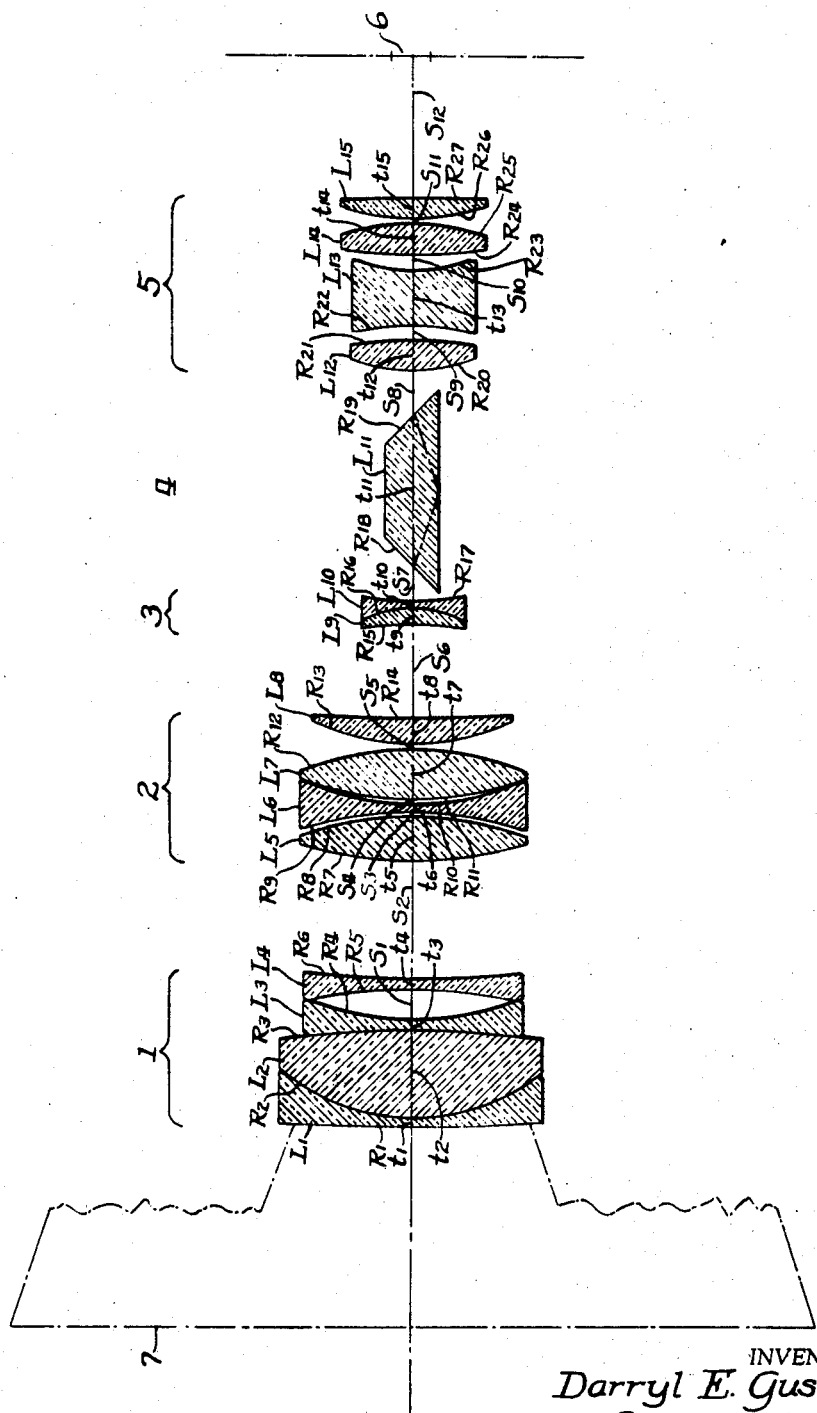
INVENTOR.
Darryl E. Gustafson.

United States Patent Office 3,360,325
Patented Dec. 26, 1967

3,360,325
ZOOM LENS SYSTEM FOR MICROFILM PROJECTORS
Darryl E. Gustafson, Lincolnwood, Ill., assignor to Bell & Howell Company, Chicago, Ill., a corporation of Illinois
Filed May 27, 1964, Ser. No. 370,517
1 Claim. (Cl. 350—184)

ABSTRACT OF THE DISCLOSURE

A mechanical compensation zoom lens system for use at finite conjugates made up of a positive zooming member in axial alignment with and between a fixed rear positive member and a front negative compensating member, in which the zooming member consists of a biconvex triplet component in front of a single positive element convex to the front and the compensating member consists of a negative triplet component concave toward the rear and in front of a single biconcave element.

---

This invention relates to zoom lens systems of the mechanical compensation type and to optical systems for projecting images at finite conjugates, such as enlargers, table top projectors and particularly microfilm projectors.

The object of the invention is to provide an optical zoom system that is highly corrected at finite conjugates, particularly at magnification in the range from about 20× to about 40×.

A further object of the invention is to provide an optical zoom system that is highly corrected for use at magnifications in the range from about 20× to about 40× and operating between object and image planes that are a fixed distance apart.

A still further object of the invention is to provide an optical zoom system adapted to include an image-rotation (or "anti-rotation") prism.

A particular object of the invention is to provide a zoom system in which the aberrations are well balanced for use in projecting different sizes of film area onto a constant size screen.

Zoom lens systems are well known, and comprise two or more members of which at least two are movable. In the so-called optical compensation type, the movements of the movable members are linearly related (usually equal) and the position of the image is maintained only approximately. In the mechanical compensation type, to which the present invention relates, there are two movable members controlled by cam action or some mechanical equivalent thereof. One movable member, called the "zooming member" has a greater effect on the magnification and a smaller effect on the image position than the other movable member, called the "compensating member," and the image is maintained in exactly the same position during zooming within the degree of accuracy of the cam.

The "front" of the system is the end facing the longer conjugate in accordance with the usual convention.

According to the present invention, a mechanical compensation zoom lens system for use at finite conjugates is made up comprising a positive zooming member in axial alignment with and between a fixed rear positive member and a front negative compensating member, in which the zooming member consists of a biconvex triplet component in front of a single positive element convex to a front and the compensating member consists of a negative triplet component concave toward the rear and in front of a single biconcave element. The fixed rear positive member may be broadly of conventional construction. Ordinarily such a prime lens is designed by known procedures to have aberrations equal and opposite to the average aberrations of the zooming portion of the system.

This ordinary approach is only partially effective, however, in the particular case in which the screen size is constant, because there is no part of the lens system which will affect the focal plane aberrations equally at all focal length positions. The only aberrations which may be treated in the usual manner are those which depend on aperture only and not on the field angle, namely spherical aberration and axial color. The remaining aberrations can be stabilized to a small degree in the variable focus section, but the major aberration balancing must be performed by treating the system in its entirety.

The computing of the lens positions for various degrees of zooming is a slightly longer process than in ordinary zoom systems because the distance from the screen to the compensating member enters as an additional variable. One convenient method of computing them comprises four stages as follows: The first stage is to trace rays from the short conjugate or film plane through the fixed member and the zooming member for a series of positions of the zooming member to determine the several positions of the intermediate image plane. The second stage is to trace rays from the screen plane through the compensating member (the front member) for a series of screen-to-lens distances to determine the position of the image of the screen for each. The third stage is to interpolate from the latter series to match the intermediate image plane positions of the former series and optionally to compute through the whole system to verify the results. This is all that is needed for computing lens positions during design. The fourth stage, needed for designing the cam mechanism, is to interpolate as many additional values as required between the series of values computed in the first three stages.

It will be clear to those skilled in the art that if the zooming member passes through its unit-magnification position in the range chosen, then the compensating member moves first away from the screen and then back toward the screen when the system is zoomed from one end of its range to the other. However, in the particular example described below, this is not the case. The range chosen is such that when the front member is in its farthest forward position, the second member is in its farthest rearward position, and vice versa. This is done to provide more space for the image-rotating prism in accordance with a particular object of the invention.

According to a special form of the invention, the rear fixed positive member comprises a front negative portion or collimating lens, a rear positive portion or prime lens and an image rotating prism therebetween. Preferably, the collimating lens consists of a negative compound component and the prime lens consists of a plurality of positive components and a biconcave negative component between two of them. The light between the two portions is substantially collimated to avoid the introduction of aberrations as it passes through the rotation prism.

Of the several known types of rotation prisms, the dove prism is preferred. A short prism (optically) is desirable to avoid vignetting the light near the edge of the field, and a dove prism made of high index glass is among the shortest known. Also, a direct-vision prism is required so that the pupil remains substantially centered on the optical axis. A dove prism is inexpensive since it requires only one (unsilvered) reflecting surface and the angles are conveniently but not necessarily 45°, and do not have to be held to a very close tolerance. If the light is collimated as it traverses the prism, there are no aberrations introduced except some relatively unimportant one-sided aberrations of the pupil. Even if there is a small degree of convergence or divergence, the aberrations still are negligible. The prism can be made of flint glass, which is relatively inexpensive.

A roof prism can be used if preferred, but it is much more expensive, and the addition of the roof reflection is merely equivalent to turning the film over in the film plane.

In the accompanying drawing:

The single figure shows a zoom system according to a preferred form of the invention.

In the figure the zooming member 2 consists of a triplet component $L_5L_6L_7$ and a singlet $L_8$ and is axially aligned between a front compensating member 1 and a rear fixed member comprising a negative collimating component 3, an image-rotation prism 4 and a prime lens 5. The front compensating member 1 consists of a negative triplet component $L_1L_2L_3$ and a biconcave singlet $L_4$, all in accordance with a preferred form of the invention. The prime lens 5 consists of a plurality of positive elements $L_{12}$, $L_{14}$ and $L_{15}$ and a biconcave component $L_{13}$ between two of them in accordance with a preferred feature of the invention.

The system is intended for the projection of a variable film area 6 onto a screen 7 of approximately constant size, although obviously it can be used for "blowing up" a central portion of a film area for viewing at a larger magnification.

One of the triplet components is cemented and the other has small airspaces. These two structures are considered to be equivalent, in conformity with the usual custom.

The following table gives details of construction of one example according to a preferred form of the invention:

This table gives the radii of curvature R of the optical surfaces, the axial thicknesses $t$ of the optical element, the spaces $s$ between elements, the refractive indices N and the conventional dispersive indices V, each numbered by subscripts from front to rear. The last space, $s_{12}$, is the distance to the film plane G. The unit of measurement is one inch.

The prism is a conventional dove prism with 45° angles and made of a high index glass, N=1.751. The dispersion is not critical, and I prefer flint glass because it is relatively inexpensive.

The embodiments of the invention in which an exclusive property or privilege is claimed are defined as follows:

A zoom lens system of the mechanical compensation type for imaging an object area onto an image plane at a fixed finite distance therefrom, comprising a movable positive zooming member in axial alignment with and between a fixed rear positive member and a movable front negative compensating member, in which the zooming member consists of a biconvex triplet component in front of a single positive element convex to the front and the compensating member consists of a negative triplet concave toward the rear and in front of a single biconcave element, and in which the power of the front surface of the biconcave element is greater than the power of the rear surface thereof and the power of the rear surface of the positive element is greater than the power of the front surface thereof, and in which detailed data is as follows:

Magnification = {20.0 (Telephoto), 28.3 (Median), 40.0 (Wide Angle)}
Track Length = 35.5 inches

| Element | R | t / s | N | V |
|---|---|---|---|---|
| $L_1$ | $R_1 = +16.70$ | $t_1 = .070$ | $N_1 = 1.620$ | $V_1 = 60.3$ |
| $L_2$ | $R_2 = +1.516$ | $t_2 = .650$ | $N_2 = 1.751$ | $V_2 = 27.8$ |
| $L_3$ | $R_3 = -7.115$ | $t_3 = .070$ | $N_3 = 1.689$ | $V_3 = 30.9$ |
|  | $R_4 = +2.100$ | $s_1 = .220$ |  |  |
| $L_4$ | $R_5 = -2.894$ | $t_4 = .088$ | $N_4 = 1.734$ | $V_4 = 51.2$ |
|  | $R_6 = +2.434$ | $s_2 = \{.885$ (Telephoto), $1.912$ (Median), $2.842$ (Wide Angle)$\}$ |  |  |
| $L_5$ | $R_7 = +2.894$ | $t_5 = .350$ | $N_5 = 1.651$ | $V_5 = 55.8$ |
|  | $R_8 = -2.434$ | $s_3 = .005$ |  |  |
| $L_6$ | $R_9 = -2.660$ | $t_6 = .070$ | $N_6 = 1.751$ | $V_6 = 27.8$ |
|  | $R_{10} = +1.912$ | $s_4 = .040$ |  |  |
| $L_7$ | $R_{11} = +2.434$ | $t_7 = .400$ | $N_7 = 1.651$ | $V_7 = 55.8$ |
|  | $R_{12} = -2.258$ | $s_5 = .007$ |  |  |
| $L_8$ | $R_{13} = +1.720$ | $t_8 = .192$ | $N_8 = 1.697$ | $V_8 = 56.2$ |
|  | $R_{14} = +10.54$ | $s_6 = \{.7038$ (Telephoto), $.2646$ (Median), $.0745$ (Wide Angle)$\}$ |  |  |
| $L_9$ | $R_{15} = -2.434$ | $t_9 = .135$ | $N_9 = 1.751$ | $V_9 = 27.8$ |
| $L_{10}$ | $R_{16} = -.775$ | $t_{10} = .035$ | $N_{10} = 1.697$ | $V_{10} = 56.2$ |
|  | $R_{17} = +2.019$ | $s_7 = .260$ |  |  |
| $L_{11}$ | $R_{18} = \infty$ | $t_{11} = 1.070$ | $N_{11} = 1.751$ | $V_{11} = 27.8$ |
|  | $R_{19} = \infty$ | $s_8 = .326$ |  |  |
| $L_{12}$ | $R_{20} = +1.280$ | $t_{12} = .220$ | $N_{12} = 1.697$ | $V_{12} = 56.2$ |
|  | $R_{21} = -2.883$ | $s_9 = .110$ |  |  |
| $L_{13}$ | $R_{22} = -1.818$ | $t_{13} = .400$ | $N_{13} = 1.751$ | $V_{13} = 27.8$ |
|  | $R_{23} = +1.190$ | $s_{10} = .115$ |  |  |
| $L_{14}$ | $R_{24} = +4.001$ | $t_{14} = .230$ | $N_{14} = 1.620$ | $V_{14} = 60.3$ |
|  | $R_{25} = -1.664$ | $s_{11} = .010$ |  |  |
| $L_{15}$ | $R_{26} = +1.664$ | $t_{15} = .190$ | $N_{15} = 1.620$ | $V_{15} = 60.3$ |
|  | $R_{27} = -12.85$ | BF = 1.03 |  |  | wherein L is the element; R is the radius of curvature of the optical surface; $t$ is the axial thickness of the optical element; $s$ is the space between elements; N is the index of refraction; and V is the conventional dispersive index.

No references cited.

JEWELL H. PEDERSEN, *Primary Examiner.*

R. J. STERN, *Assistant Examiner.*